United States Patent
Chen (10) Patent No.: US 10,706,765 B2
(45) Date of Patent: Jul. 7, 2020

(54) COMPRESSION ALGORITHM VERIFICATION METHOD, STORAGE MEDIUM, AND DISPLAY DEVICE

(71) Applicants: HKC Corporation Limited, Baoan Dist, Shenzhen (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 15/740,355

(22) PCT Filed: Jul. 4, 2017

(86) PCT No.: PCT/CN2017/091637
§ 371 (c)(1),
(2) Date: Dec. 28, 2017

(87) PCT Pub. No.: WO2018/188203
PCT Pub. Date: Oct. 18, 2018

(65) Prior Publication Data
US 2020/0035142 A1    Jan. 30, 2020

(30) Foreign Application Priority Data
Apr. 11, 2017  (CN) .......................... 2017 1 0233863

(51) Int. Cl.
*G09G 3/20*    (2006.01)
*G09G 3/36*    (2006.01)

(52) U.S. Cl.
CPC ............. *G09G 3/2007* (2013.01); *G09G 3/36* (2013.01); *G09G 2320/0252* (2013.01); *G09G 2340/0464* (2013.01); *G09G 2340/10* (2013.01)

(58) Field of Classification Search
CPC .................. G09G 3/2007; G09G 3/36; G09G 2320/0252; G09G 2340/0464; G09G 2340/10
See application file for complete search history.

(56) References Cited

U.S. PATENT DOCUMENTS

| | | | | |
|---|---|---|---|---|
| 2006/0164365 A1* | 7/2006 | Huang | ...................... | G09G 3/36 345/98 |
| 2008/0212875 A1* | 9/2008 | Lee | ...................... | G09G 3/3611 382/166 |
| 2012/0154345 A1* | 6/2012 | Kim | ...................... | G09G 3/3648 345/204 |

* cited by examiner

*Primary Examiner* — Sing-Wai Wu
(74) *Attorney, Agent, or Firm* — Wang Law Firm, Inc.

(57) ABSTRACT

A compression algorithm verification method, a storage medium, and a display device are provided. The compression algorithm verification method includes the steps of: acquiring an original image; using an overdrive compression algorithm to be verified to sequentially compress and decompress the original image to obtain a first image; the first image being performed with image processing to obtain a second image; the first image and the second image serving as a previous frame image and a current frame image respectively, a gray scale compensation value being superimposed on the second image based on an overdrive technique to obtain a third image; and the third image being controlled to be dynamically displayed in such a manner that the first image is changed to the second image for verifying whether the overdrive compression algorithm meets the predetermined requirements.

16 Claims, 9 Drawing Sheets

COMPRESSION ALGORITHM VERIFICATION METHOD, STORAGE MEDIUM, AND DISPLAY DEVICE

CROSS-REFERENCE TO RELATED APPLICATIONS

This application claims priority to China Patent Application No. 201710233863.7 filed on Apr. 11, 2017, and entitled "COMPRESSION ALGORITHM VERIFICATION METHOD AND SYSTEM, DISPLAY DEVICE"; the entirety of which is hereby incorporated by reference.

FIELD OF THE INVENTION

The present invention relates to the liquid crystal display technology, and more particularly to a compression algorithm verification method, a storage medium, and a display device.

BACKGROUND OF THE INVENTION

A liquid crystal display has the advantages of high resolution, light in weight, low energy consumption, and so on. Therefore, it has been widely used. In the LCD, the light emitted from the backlight layer enters the liquid crystal layer after passing through the first polarizing filter layer. When liquid crystal molecules are affected by an external electric field, they will produce an accurate and orderly alignment. When the electrode in the LCD generates an electric field, the liquid crystal molecules are twisted, so that the light passing through the liquid crystal molecules is regularly refracted and then displayed on the screen through the second polarizing filter layer. However, the twist of the liquid crystal molecules requires a process, and if the response time of the liquid crystals is greater than the interval of the frame, the screen may have a smear when people watch a fast moving picture.

In order to solve the problem of smear, the overdrive technique is used to improve the response speed of the LCD. The overdrive technique shortens the response time of the liquid crystals by increasing the driving voltage. The principle is that an overdrive circuit is provided in the TCON (Timer Control Register) board of the liquid crystal display. The overdrive circuit needs to store a previous frame image. The overdrive circuit needs to store the previous frame image and compare it with the gray scale value of the current frame image, and then calculate the gray scale compensation value required for the current frame by querying the overdrive lookup table. The gray scale compensation value (equivalent to the supplied drive voltage), so that the displayed gray scale value is the target value within a prescribed time. In addition, when the overdrive circuit stores the previous frame image, the previous frame image is first compressed and then stored in order to save costs. Therefore, the compression algorithm (hereinafter referred to as overdrive compression algorithm) used by the overdrive circuit will directly affect the picture quality. Therefore, it is necessary to verify the overdrive compression algorithm to ensure the display quality of the picture.

SUMMARY OF THE INVENTION

The primary object of the present invention is to provide a compression algorithm verification method for verifying an overdrive compression algorithm, a storage medium, and a display device.

According to one aspect of the present invention, a compression algorithm verification method for verifying whether an overdrive compression algorithm of a display panel meets predetermined requirements is provided. The compression algorithm verification method comprises the steps of: acquiring an original image; using the overdrive compression algorithm to be verified to sequentially compress and decompress the original image to obtain a first image; performing image processing on the first image to obtain a second image; using the first image and the second image as a previous frame image and a current frame image respectively, and obtaining a third image with the overdrive compression algorithm by superimposing a gray scale compensation value on the second image; and controlling the third image to be dynamically displayed in such a manner that the first image is changed to the second image for verifying whether the overdrive compression algorithm meets the predetermined requirements.

According to another aspect of the present invention, a storage media containing computer-executable instructions is provided. When the computer-executable instructions are executed by at least one processor, the processor performs the steps of: acquiring an original image; using an overdrive compression algorithm to be verified to sequentially compress and decompress the original image to obtain a first image; performing image processing on the first image to obtain a second image; using the first image and the second image as a previous frame image and a current frame image respectively, and obtaining a third image with the overdrive compression algorithm by superimposing a gray scale compensation value on the second image; and controlling the third image to be dynamically displayed in such a manner that the first image is changed to the second image for verifying whether the overdrive compression algorithm meets predetermined requirements.

According to a further aspect of the present invention, a display device is provided. The display device comprises a display panel, a storage module, and a processing module. The storage module stores an original image. The processing module is connected with the storage module and the display panel, respectively. The processing module is configured to obtain the original image, compress and decompress the original image sequentially by using an overdrive compression algorithm to be verified, and obtain a first image. The first image is performed with image processing to obtain a second image. The first image and the second image serve as a previous frame image and a current frame image, respectively. A gray scale compensation value is superimposed on the second image based on an overdrive technique to obtain a third image. The third image is controlled to be dynamically displayed via the display panel in such a manner that the first image is changed to the second image for verifying whether the overdrive compression algorithm meets predetermined requirements.

According to a yet further aspect of the present invention, a compression algorithm verification method for verifying whether an overdrive compression algorithm of a display panel meets predetermined requirements is provided. The compression algorithm verification method comprising the steps of: acquiring an original image; using the overdrive compression algorithm to be verified to sequentially compress and decompress the original image to obtain a first image; shifting and combining the first image to obtain a second image; using the first image and the second image as a previous frame image and a current frame image respectively, comparing the first image with the second image, obtaining a corresponding gray scale compensation value based on an overdrive lookup table and superimposing the gray scale compensation value on the second image to obtain a third image; and controlling the third image to be dynamically displayed in such a manner that the first image is changed to the second image for verifying whether the overdrive compression algorithm meets predetermined requirements.

The compression algorithm verification method, the storage medium and the display device are used to compress and decompress the original image by the overdrive compression algorithm to be verified, and the first image is obtained, and the second image is obtained by the first image. The working mode of the overdrive circuit is simulated to obtain the third image after the overdriving process. Because the overdrive effect can only be displayed in the dynamic picture, the third image is dynamically displayed in such a manner that the first image is changed to the second image, thereby the overdrive effect can be observed to verify the feasibility of the overdrive compression algorithm.

BRIEF DESCRIPTION OF THE DRAWINGS

These and/or other aspects will become apparent and more readily appreciated from the following description of the embodiments, taken in conjunction with the accompanying drawings, in which.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Unless the context clearly indicates otherwise, throughout the description of the present disclosure, all technical and scientific terms used herein have the same meaning as commonly understood by one skilled in the art to which the invention pertains. The terminology used in the specification of the invention is for the purpose of describing particular embodiments only and is not intended to be limiting of the present application. The term "and/or" as used herein includes any and all combinations of one or more of the associated listed items.

One embodiment provides a compression algorithm verification method used for verifying whether an overdrive compression algorithm of a display panel meets the predetermined requirements. Wherein, the overdrive compression algorithm is a compression algorithm used in the overdrive technique for storing the previous frame image for comparison with the current frame image. The overdrive technique shortens the response time of the liquid crystals by increasing the driving voltage. The implementation is that an overdrive circuit is provided in the TCON (Timer Control Register) board of the liquid crystal display. The overdrive circuit needs to store the previous frame image and compare it with the gray scale value of the current frame image, and then calculate the gray scale compensation value required for the actual frame by querying the overdrive lookup table, so that the gray scale value displayed is the target value within a prescribed time.

Figure 1:
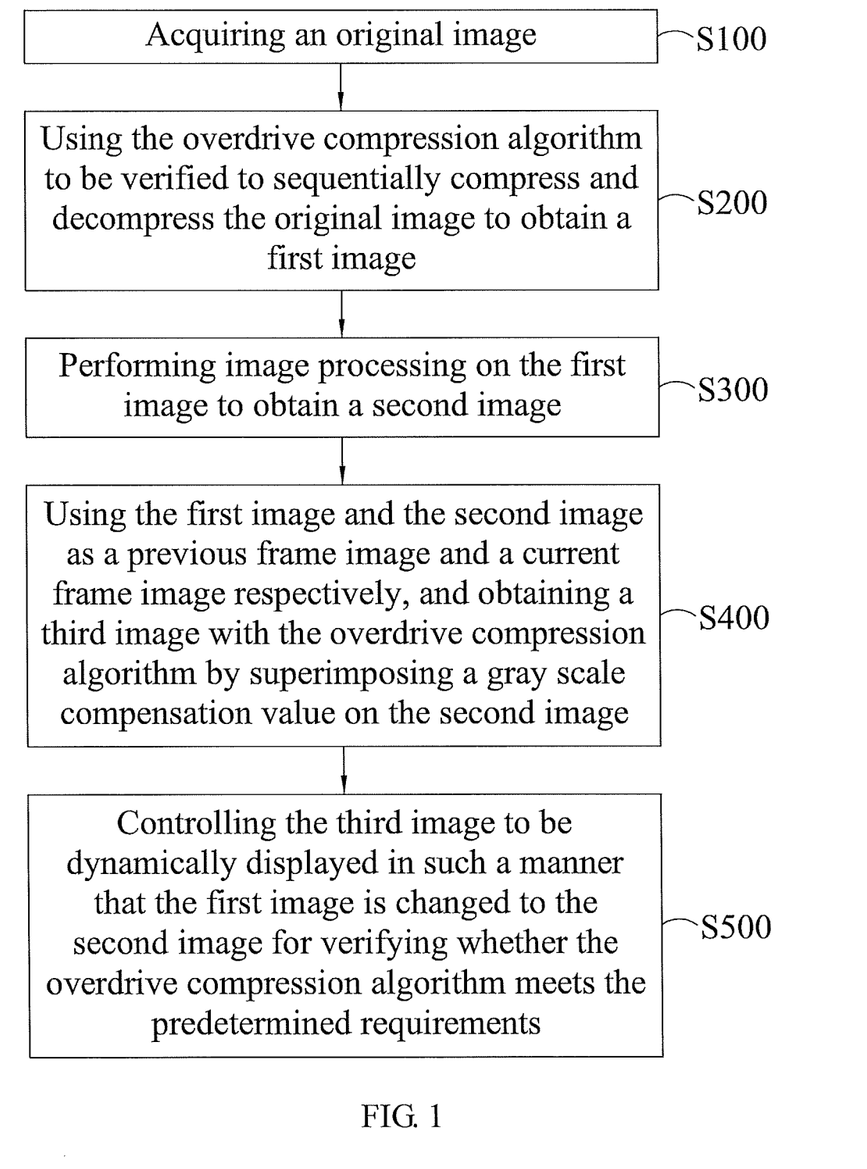
FIG. 1 is a flow chart of a compression algorithm verification method in accordance with one embodiment of the present invention.

In addition, the compression algorithm verification method provided by the embodiment of the present invention can be implemented by a smart device, such as a computer. Referring to FIG. 1, the compression algorithm verification method comprises the following steps:

In step S100, an original image is acquired.

Wherein, the original image can be arbitrarily selected. Specifically, in order to improve the speed of verification, a picture including only black and white two colors can be selected as the original image.

In step S200, the original image is sequentially compressed and decompressed by using the overdrive compression algorithm to be verified to obtain a first image.

In this step, the original image is compressed to obtain a compressed image in order to simulate the process of the overdrive circuit to compress the previous frame before it is stored. After that, the compressed image is decompressed to obtain the first image which is used to simulate the process of taking out the previous stored frame image and decompressing when the overdrive process is performed by the overdrive circuit.

In step S300, the first image is performed with image processing to obtain a second image.

Wherein, the first image can be performed with the image processing, such as shifting or linear transformation, to obtain the second image.

In step S400, the first image and the second image serve as the previous frame image and the current frame image respectively, and a gray scale compensation value is superimposed on the second image based on the overdrive technique to obtain a third image.

Wherein, the previous frame image and the current frame image are two frame images that are displayed adjacent to each other in the actual dynamic picture. The gray scale compensation value corresponds to the overdrive voltage and is used to boost the response time of the liquid crystals. The third image is an image having an overdrive effect. If the overdrive compression algorithm to be verified is qualified, the brightness can be converted from the first image to the second image in one frame period through the third image and there is no smear when the dynamic picture is displayed.

In step S500, the third image is controlled to be dynamically displayed in such a manner that the first image is changed to the second image for verifying whether the overdrive compression algorithm meets the predetermined requirements.

Wherein, the portion having an overdrive effect in the third image is a portion where the gray scale is changed when the first image is changed to the second image, so that the third image is controlled to be dynamically displayed in such a manner that the first image is changed to the second image. The area with the overdrive effect will generate a gray scale change again, and the gray scale change is in the same manner as the first image is changed to the second image. In addition, since the overdrive effect can only be displayed in the dynamic picture (i.e., the gray scale is changed), when the third image is dynamically displayed, the portion having an overdrive effect can be dynamically displayed to simulate the manner that the first image is changed to the second image, thereby simulating the actual dynamic picture display effect to identify whether there is a smear in the dynamic picture. If there is no smear, it indicates that the overdrive compression algorithm is qualified, that is, the overdrive compression algorithm meets the predetermined requirements; otherwise, the overdrive compression algorithm does not meet the predetermined requirements.

In view of the above, the compression algorithm verification method provided by the embodiment of the present invention can simulate the overdrive effect of the actual dynamic picture through the dynamic display mode of the third image so as to verify the compression algorithm verification method.

Figure 2:
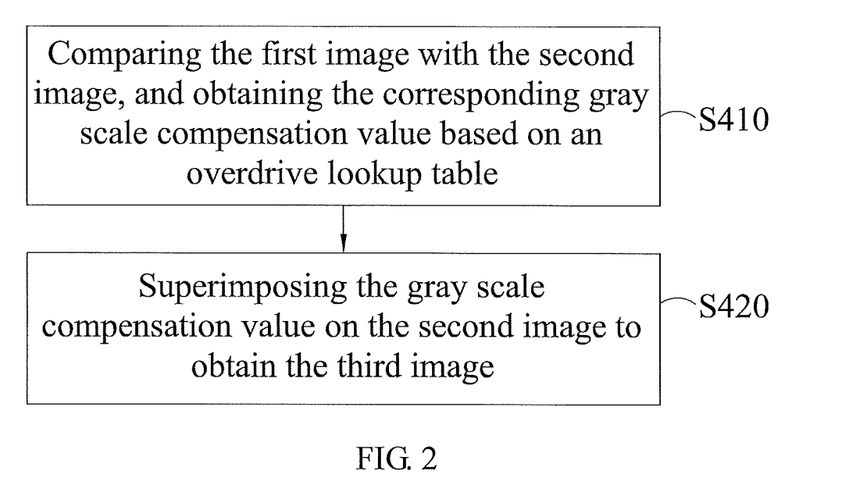
FIG. 2 is a flow chart of the step S400 of the compression algorithm verification method of the embodiment shown in FIG. 1.

In one embodiment, the step S400 includes the following steps, referring to FIG. 2.

In step S410, the first image is compared with the second image, and the corresponding gray scale compensation value is obtained based on the overdrive lookup table.

Wherein when the first image is compared with the second image, the gray scale of each pixel in the first image is compared with the gray scale of each pixel in the second image, so that the gray scale compensation value corresponding to the pixel whose gray scale is about to change is determined based on the overdrive lookup table.

In step S420, the gray scale compensation value is superimposed on the second image to obtain the third image.

Wherein the gray scale compensation value is superimposed on the second image, which is equivalent to that a frame image including the gray scale compensation value is additionally added on the basis of the second image. In the actual liquid crystal display, the driving voltage applied at the time of starting the second image is slightly higher than the corresponding voltage of the target, so that the liquid crystal molecules are rotated at a higher speed.

In one embodiment, in step S300, the first image is shifted and combined to obtain the second image.

Wherein, as to the implementation of shifting and combining the first image, for example, a plurality of columns at the rightmost of the first image are moved to the leftmost; or a plurality of rows at the top of the first images are moved to the bottom; or the first image is shifted and combined at other angle.

It can be understood that the first image may also be processed in other manner to obtain a second image.

In one embodiment, based on the manner that the first image is changed to the second image, in step S500, the third image is controlled to be dynamically displayed in such a manner that the first image is changed to the second image, wherein the third image is controlled to be displayed by scrolling, and the third image is scrolled in the same manner as that the first image is changed to the second image.

Wherein, the manner of each scrolling involves the scrolling direction and the scrolling speed. The scrolling direction is, for example, from right to left, from left to right, from top to bottom, from bottom to top or in other directions. When the scrolling direction is from left to right or from right to left, the scrolling speed is the number of columns per scrolling; or when the scrolling direction is from top to bottom or from bottom to top, the scrolling speed is the number of rows per scrolling.

In the embodiment of the present invention, the third image is scrolled in the same manner as that the first image is changed to the second image, that is, the direction of scrolling is the same as the direction the shift of the first image, and the number of each scrolling is the same as the number of the scrolling of the first image. Specifically, if the second image is formed by shifting the first image to the right by 10 columns, the third image is scrolled to the right by 10 columns each time.

Since the third image is an image having the overdrive effect formed for the first image to become the second image, and the overdrive effect can be displayed only in the dynamic picture (i.e., the gray level is changed). Thus, the third image is scrolled in the same manner as the first image is shifted and changed to the second image, thereby achieving the actual dynamic picture display effect from the first image to the second image. In addition, controlling the third image to be displayed by scrolling can continue to view the overdrive effect, which is convenient for checking whether there is a smear.

Figure 3:
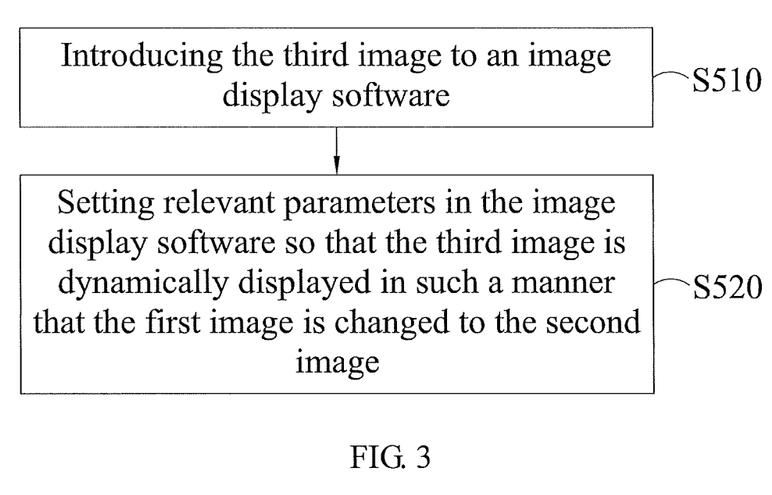
FIG. 3 is a flow chart of the step S500 of the compression algorithm verification method of the embodiment shown in FIG. 1.

In one embodiment, the step of controlling the third image to be dynamically displayed in such a manner that the first image is changed to the second image includes the following steps, referring to FIG. 3.

In step S510, the third image is introduced to an image display software.

Wherein, the image display software is an image player which can automatically display images.

In step S520, the relevant parameters in the image display software are set so that the third image is dynamically displayed in such a manner that the first image is changed to the second image.

Wherein, by setting the parameters in the image display software, the third image is displayed in accordance with the predetermined requirements. Specifically, the relevant parameters are set in the image display software so that the third image is displayed by scrolling in such a manner that the first image is changed to the second image. If it is necessary to control the third image to be displayed by scrolling, the relevant parameters may include the scrolling direction and the scrolling speed. If the second image is formed by shifting the first image to the right by 10 columns, the scrolling direction may be set from left to right and the scrolling speed is 10 columns per frame, such that the third image is scrolled to the right by 10 columns each time through the image display software.

It should be noted that the step S100 to step S400 in the compression algorithm verification method provided by the embodiment of the present invention can be performed by the MATLAB software, and the third image can be displayed by using the image display software. Thus, it is convenient and quick to verify the overdrive compression algorithm, without consuming a lot of resources, thereby saving the cost.

Figure 4:
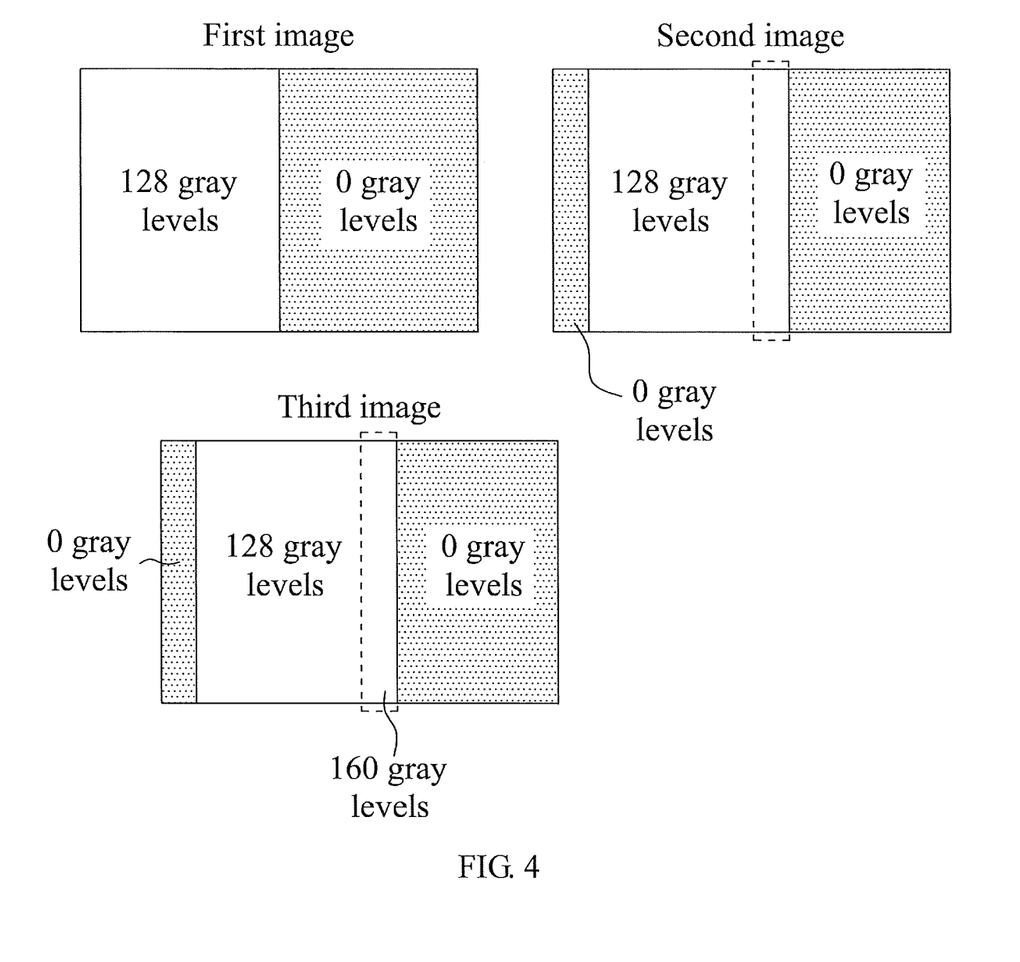
FIG. 4 is a schematic view of an image of the compression algorithm verification method of the embodiment shown in FIG. 1.

Next, the compression algorithm verification method provided by the present invention will be briefly described with reference to FIG. 4 as an example. The first image is set to include two colors, 0 gray level and 128 gray levels. The first image is shifted to the right by 10 columns, and the rightmost 10 columns are moved to the left of the first image to form the second image. When the actual dynamic picture is displayed, that is, when the first image is changed to the second image, the portion that the gray level is changed is the middle portion indicated by a dashed frame, which is changed from 0 gray level to 128 gray levels, and this portion includes 10 columns. The portion in the third image that is processed with the overdrive is the portion indicated by a dashed frame. In addition, the third image is controlled to be displayed by scrolling to the right for 10 columns each time.

If 0 gray level is changed to 128 gray levels, the corresponding gray scale compensation value is 160 gray levels. When the first image is normally displayed to the second image, the part indicated by the dashed frame should first reach 160 gray levels. In the embodiment of the present invention, it is possible to simulate the dynamic display effect by scrolling the third image. The principle is that since the third image is scrolled to the right and 10 columns are scrolled each time, that is, the scrolling speed is 10 columns per frame, so the 10 columns applied with 160 gray levels is just one frame time. For simulating 0 gray level to be changed to 128 gray levels, it is first driven to the state of 160 gray levels so that the overdrive effect can be seen. Because the picture is scrolled continuously, so that the overdrive effect can be continuously seen to determine whether the overdrive effect is qualified, that is, to determine whether there is a smear in the dynamic picture. If yes, it means the overdrive effect is qualified, which can verify the above compression algorithm verification method is qualified, otherwise, the compression algorithm verification method is failed.

It will be understood by those skilled in the art that all or part of the process of the aforesaid embodiments may be accomplished by means of a computer program to command the related hardware. The program may be stored in a storage medium (e.g., a nonvolatile computer readable storage medium). The program may, when executed, include the process of the embodiments as described above. The storage medium may be a hard disk, a compact disk, a read-only memory (ROM), or the like.

Figure 5:
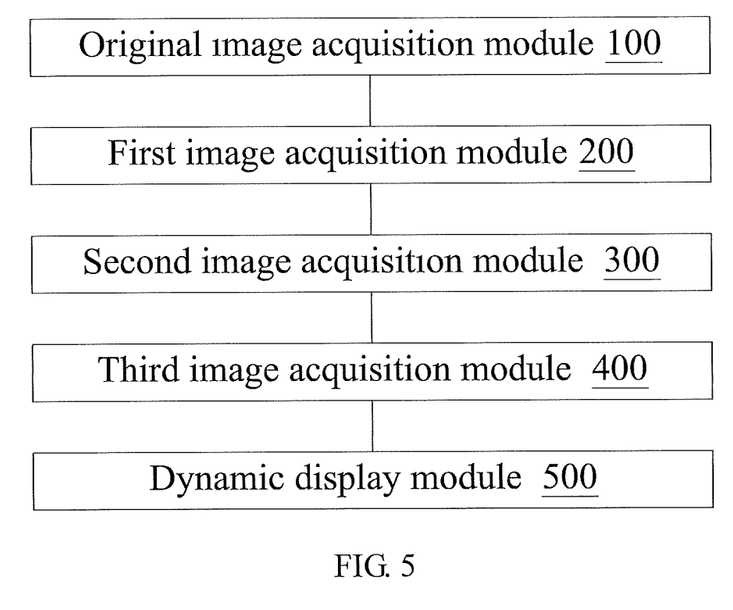
FIG. 5 is a flow chart of a compression algorithm verification system in accordance with another embodiment of the present invention.

In another embodiment, a compression algorithm verification system is provided. The compression algorithm verification system is used for verifying whether an overdrive compression algorithm of a display panel meets the predetermined requirements. Wherein, the overdrive compression algorithm is a compression algorithm used in the overdrive technique for storing the previous frame image for comparison with the current frame image. Referring to FIG. 5, the compression algorithm verification system includes an original image acquisition module 100, a first image acquisition module 200, a second image acquisition module 300, a third image acquisition module 400, and a dynamic display module 500. The original image acquisition module 100 is configured to obtain an original image. The first image acquisition module 200 is configured to sequentially compress and decompress the original image by using the overdrive compression algorithm to be verified to obtain a first image. The first image is performed with image processing to obtain a second image. The first image and the second image serve as the previous frame image and the current frame image respectively, and a gray scale compensation value is superimposed on the second image based on the overdrive technique to obtain a third image. The third image is controlled to be dynamically displayed in such a manner that the first image is changed to the second image for verifying whether the overdrive compression algorithm meets the predetermined requirements.

Figure 6:
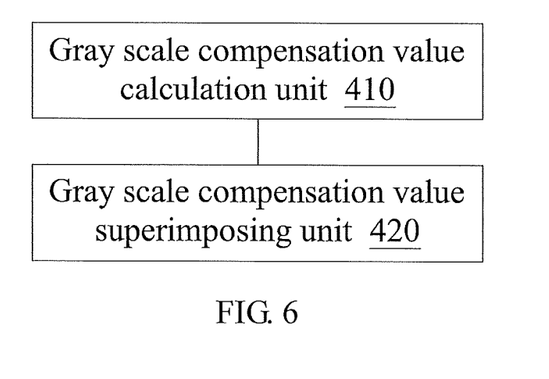
FIG. 6 is a flow chart of a third image acquisition module of the compression algorithm verification system of the embodiment shown in FIG. 5.

In one embodiment, third image acquisition module 400 includes a gray scale compensation value calculation unit 410 and a gray scale compensation value superimposing unit 420 as shown in FIG. 6. The gray scale compensation value calculation unit 410 is configured to compare the first image with the second image and obtain a corresponding gray scale compensation value based on the overdrive lookup table. The gray scale compensation value superimposing unit 420 is configured to superimpose the gray scale compensation value on the second image to obtain the third image.

In one embodiment, the second image acquisition module 300 includes a shifting and combining unit configured to shift and combine the first image to obtain the second image.

In one embodiment, the dynamic display module 500 includes a scrolling display unit configured to control the third image to be displayed by scrolling, and the third image is scrolled in the same manner as that the first image is changed to the second image.

Figure 7:
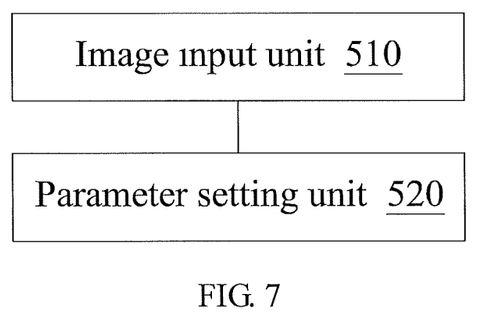
FIG. 7 is a flow chart of a dynamic display module of the compression algorithm verification system of the embodiment shown in FIG. 5.

In one embodiment, referring to FIG. 7, the dynamic display module 500 includes an image input unit 510 and a parameter setting unit 520. The image input unit 510 is configured to input the third image into the image display software.

The parameter setting unit 520 is configured to set the relevant parameters in the image display software so that the third image is dynamically displayed in such a manner that the first image is changed to the second image.

In summary, the compression algorithm verification system provided by the embodiment of the present invention can simulate the actual dynamic picture overdrive effect by the dynamic display mode of the third image so as to verify the compression algorithm verification method.

It should be noted that the compression algorithm verification system provided by the embodiment of the present invention corresponds to the compression algorithm verification method provided by the aforesaid embodiment, and will not be described here.

Figure 8:
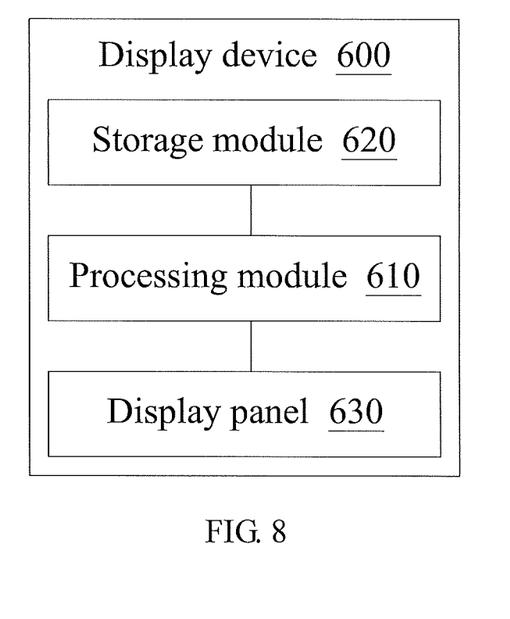
FIG. 8 is a flow chart of a display device in accordance with another embodiment of the present invention.

In another embodiment, a display device 600 is provided. Referring to FIG. 8, the display device 600 is a computer or the like. The display device 600 includes a processing module 610, a storage module 620, and a display panel 630. The processing module 610 is connected with the storage module 620 and the display panel 630, respectively.

The storage module 620 stores an original image. The storage module 620 is, for example, RAM (Ramada Access Memory), FIFO (First In First Out) memory, and the like.

The processing module 610 is an integrated circuit having the capability of data processing, such as a CPU (Central Processing Unit). The processing module 610 is configured to obtain the original image, compress and decompress the original image sequentially with the overdrive compression algorithm to be verified, and obtain a first image, and then the first image is performed with image processing to obtain a second image. The first image and the second image serve as the previous frame image and the current frame image respectively, and a gray scale compensation value is superimposed on the second image based on the overdrive technique to obtain a third image.

The third image is controlled to be dynamically displayed via the display panel 630 in such a manner that the first image is changed to the second image for verifying whether the overdrive compression algorithm meets the predetermined requirements. The display panel 630 is a liquid crystal display, a plasma display, and the like.

In one embodiment, the processing module 610 is configured to compare the first image with the second image and obtain a corresponding gray scale compensation value based on the overdrive lookup table, and the gray scale compensation value is superimposed on the second image to obtain the third image.

In one embodiment, the processing module 610 is configured to shift and combine the first image to obtain the second image.

In one embodiment, the processing module 610 is configured to control the third image to be displayed by scrolling, and the third image is scrolled in the same manner as that the first image is changed to the second image.

In one embodiment, the processing module 610 is configured to input the third image to the image display software and set the relevant parameters in the image display software so that the third image is dynamically displayed in such a manner that the first image is changed to the second image.

It should be noted that the method performed by the processing module 610 in the display device provided in the embodiment of the present application corresponds to the compression algorithm verification method provided in the aforesaid embodiment, and will not be described hereinafter.

Figure 9:
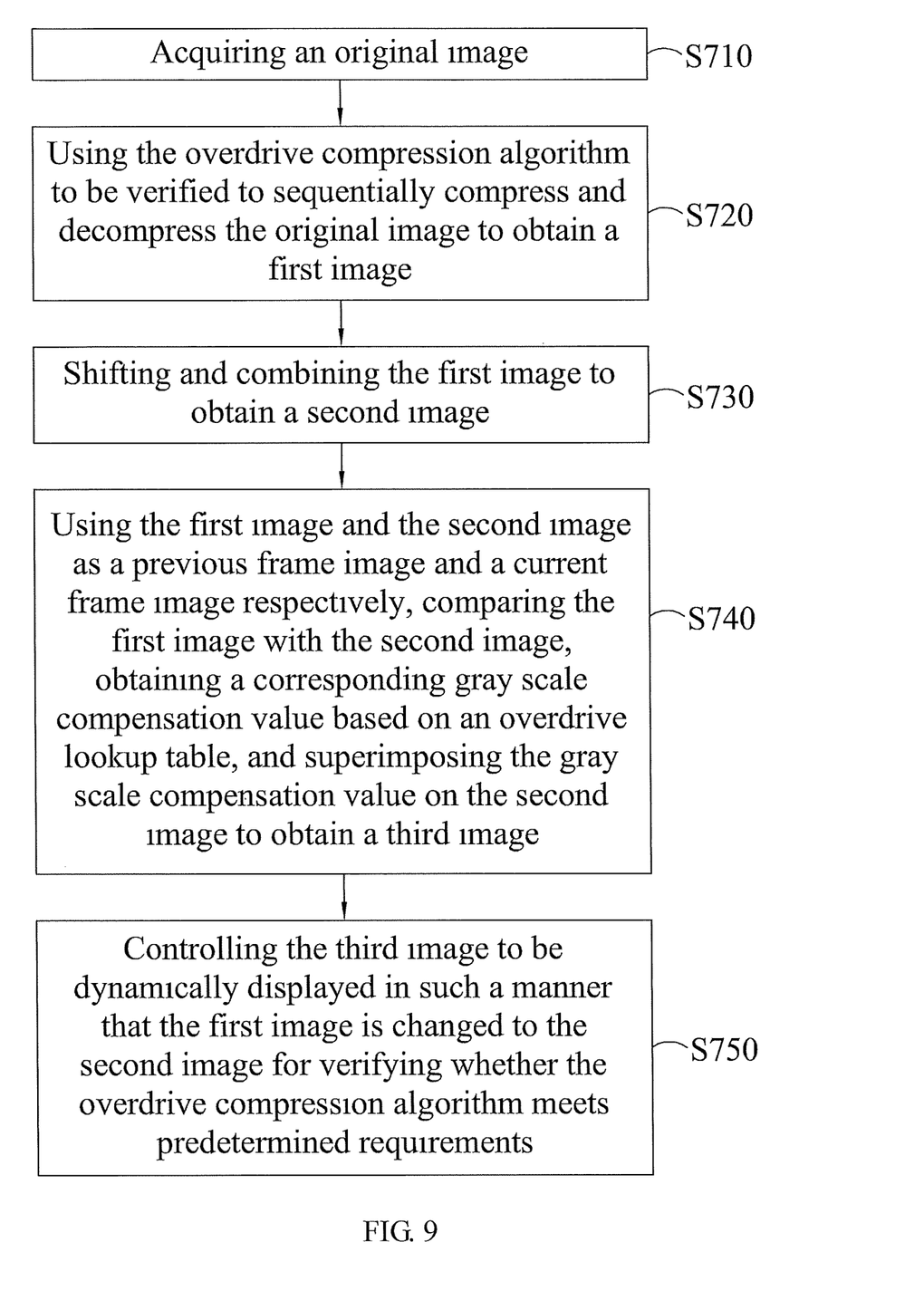
FIG. 9 is a flow chart of a compression algorithm verification method in accordance with another embodiment of the present invention.

Another embodiment provides a compression algorithm verification method that is configured to verify whether the overdrive compression algorithm of the display panel meets the predetermined requirements. Referring to FIG. 9, the method comprises the following steps:

In step S710, an original image is acquired.

In step S720, the original image is sequentially compressed and decompressed by using the overdrive compression algorithm to be verified to obtain a first image.

In step S730, the first image is shifted and combined to obtain a second image.

In step S740, the first image and the second image serve as the previous frame image and the current frame image respectively, the first image is compared with the second image, a corresponding gray scale compensation value is obtained based on the overdrive lookup table, and the gray scale compensation value is superimposed on the second image to obtain a third image.

In step S750, the third image is controlled to be dynamically displayed in such a manner that the first image is changed to the second image for verifying whether the overdrive compression algorithm meets the predetermined requirements.

It should be noted that the compression algorithm verification method provided in the embodiment of the present application has the same corresponding steps as the compression algorithm verification method provided in the aforesaid embodiments, and will not be described hereinafter.

It should be noted that FIG. 1 to FIG. 3 and FIG. 9 are flowcharts of the method of the embodiments of the present inventions.

It should be understood that although the steps in the flowcharts of FIG. 1 to FIG. 3 and FIG. 9 are sequentially displayed as indicated by the arrows, these steps are not necessarily performed in the order indicated by the arrows. Unless expressly stated herein, the execution of these steps is not strictly restrictive and may be performed in other order. As mentioned, in view of the example systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

It should be understood that the exemplary embodiments described therein should be considered in a descriptive sense only and not for purposes of limitation. Descriptions of features or aspects within each embodiment should typically be considered as available for other similar features or aspects in other embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A compression algorithm verification method for verifying whether an overdrive compression algorithm of a display panel meets predetermined requirements,
    wherein the compression algorithm verification method comprises the steps of:
        acquiring an original image;
        using the overdrive compression algorithm to be verified to sequentially compress and decompress the original image to obtain a first image;
        performing image processing on the first image to obtain a second image;
        using the first image and the second image as a previous frame image and a current frame image respectively, and obtaining a third image with the overdrive compression algorithm by superimposing a gray scale compensation value on the second image; and
        controlling the third image to be dynamically displayed in such a manner that the first image is changed to the second image for verifying whether the overdrive compression algorithm meets the predetermined requirements.

2. The compression algorithm verification method as claimed in claim 1, wherein the step of obtaining the third image with the overdrive compression algorithm by superimposing the gray scale compensation value on the second image comprises:
    comparing the first image with the second image, and obtaining the corresponding gray scale compensation value based on an overdrive lookup table; and
    superimposing the gray scale compensation value on the second image to obtain the third image.

3. The compression algorithm verification method as claimed in claim 1, wherein the step of performing image processing on the first image to obtain the second image comprises:
    shifting and combining the first image to obtain the second image.

4. The compression algorithm verification method as claimed in claim 3, wherein the step of controlling the third image to be dynamically displayed in the manner that the first image is changed to the second image comprises:

controlling the third image to be displayed by scrolling, and the third image being scrolled in the same manner as that the first image is changed to the second image.

5. The compression algorithm verification method as claimed in claim 1, wherein the step of controlling the third image to be dynamically displayed in the manner that the first image is changed to the second image comprises:
   introducing the third image to an image display software; and
   setting relevant parameters in the image display software so that the third image is dynamically displayed the manner that the first image is changed to the second image.

6. A non-transitory computer readable storage media containing computer-executable instructions, when the computer-executable instructions are executed by at least one processor, the processor performs the steps of:
   acquiring an original image;
   using an overdrive compression algorithm to be verified to sequentially compress and decompress the original image to obtain a first image;
   performing image processing on the first image to obtain a second image;
   using the first image and the second image as a previous frame image and a current frame image respectively, and obtaining a third image with the overdrive compression algorithm by superimposing a gray scale compensation value on the second image; and
   controlling the third image to be dynamically displayed in such a manner that the first image is changed to the second image for verifying whether the overdrive compression algorithm meets predetermined requirements.

7. The non-transitory computer readable storage media as claimed in claim 6, wherein the step of obtaining the third image with the overdrive compression algorithm by superimposing the gray scale compensation value on the second image comprises:
   comparing the first image with the second image, and obtaining the corresponding gray scale compensation value based on an overdrive lookup table; and
   superimposing the gray scale compensation value on the second image to obtain the third image.

8. The non-transitory computer readable storage media as claimed in claim 6, wherein the step of performing image processing on the first image to obtain the second image comprises:
   shifting and combining the first image to obtain the second image.

9. The non-transitory computer readable storage media as claimed in claim 8, wherein the step of controlling the third image to be dynamically displayed in the manner that the first image is changed to the second image comprises:
   controlling the third image to be displayed by scrolling, and the third image being scrolled in the same manner as that the first image is changed to the second image.

10. The non-transitory computer readable storage media as claimed in claim 6, wherein the step of controlling the third image to be dynamically displayed in the manner that the first image is changed to the second image comprises:
   introducing the third image to an image display software; and
   setting relevant parameters in the image display software so that the third image is dynamically displayed in the manner that the first image is changed to the second image.

11. A display device, comprising:
   a display panel;
   a storage module, storing an original image; and
   a processing module, connected with the storage module and the display panel respectively, the processing module being configured to obtain the original image, compress and decompress the original image sequentially by using an overdrive compression algorithm to be verified, and obtain a first image, the first image being performed with image processing to obtain a second image, the first image and the second image serving as a previous frame image and a current frame image respectively, a gray scale compensation value being superimposed on the second image based on the overdrive compression algorithm to obtain a third image, the third image being controlled to be dynamically displayed via the display panel in such a manner that the first image is changed to the second image for verifying whether the overdrive compression algorithm meets predetermined requirements.

12. The display device as claimed in claim 11, wherein the processing module is configured to compare the first image with the second image and obtain the corresponding gray scale compensation value based on an overdrive lookup table, and the gray scale compensation value is superimposed on the second image to obtain the third image.

13. The display device as claimed in claim 11, wherein the processing module is configured to shift and combine the first image to obtain the second image.

14. The display device as claimed in claim 13, wherein the processing module is configured to control the third image to be displayed by scrolling, and the third image is scrolled in the same manner as that the first image is changed to the second image.

15. The display device as claimed in claim 11, wherein the processing module is configured to introduce the third image to an image display software and set relevant parameters in the image display software so that the third image is dynamically displayed in such a manner that the first image is changed to the second image.

16. A compression algorithm verification method for verifying whether an overdrive compression algorithm of a display panel meets predetermined requirements, the compression algorithm verification method comprising the steps of:
   acquiring an original image;
   using the overdrive compression algorithm to be verified to sequentially compress and decompress the original image to obtain a first image;
   shifting and combining the first image to obtain a second image;
   using the first image and the second image as a previous frame image and a current frame image respectively, comparing the first image with the second image, obtaining a corresponding gray scale compensation value based on an overdrive lookup table, and superimposing the gray scale compensation value on the second image to obtain a third image; and
   controlling the third image to be dynamically displayed in such a manner that the first image is changed to the second image for verifying whether the overdrive compression algorithm meets predetermined requirements.

* * * * *